No. 614,999. Patented Nov. 29, 1898.
W. E. TAFT.
DRIVING MECHANISM FOR BICYCLES.
(Application filed Dec. 29, 1897.)

(No Model.)

WITNESSES:

INVENTOR:
Walter E. Taft.

UNITED STATES PATENT OFFICE.

WALTER E. TAFT, OF PROVIDENCE, RHODE ISLAND, ASSIGNOR, BY DIRECT AND MESNE ASSIGNMENTS, TO THE UNIVERSAL MANUFACTURING COMPANY, OF MAINE.

DRIVING MECHANISM FOR BICYCLES.

SPECIFICATION forming part of Letters Patent No. 614,999, dated November 29, 1898.

Application filed December 29, 1897. Serial No. 664,428. (No model.)

*To all whom it may concern:*

Be it known that I, WALTER E. TAFT, a citizen of the United States, residing at Providence, in the State of Rhode Island, have invented a new and useful Improvement in Driving Mechanism for Bicycles, of which the following is a specification.

The object of my invention is to provide practical means for transmitting power to the driving-wheel by the employment of gears arranged in such a manner that what is termed a "narrow tread" may be attained; and it consists in an improved combination and arrangement of gearing, as hereinafter fully set forth.

Figure 1:
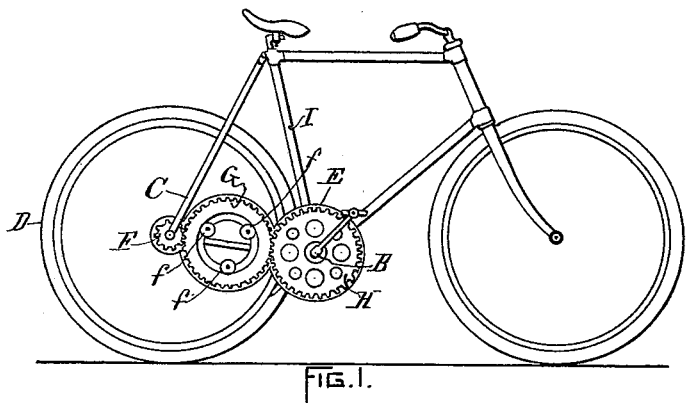
Figure 2:
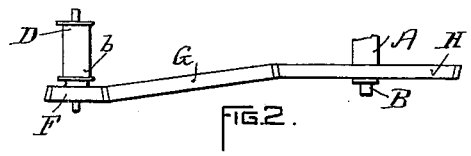
Figure 3:
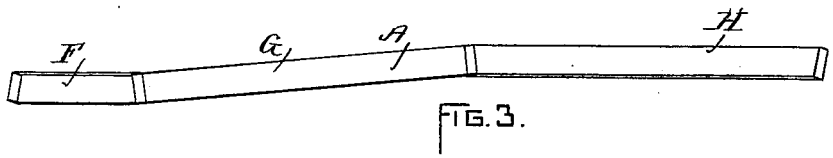
Figure 4:
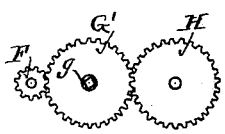

In the accompanying drawings, Figure 1 represents a side view of a bicycle provided with my improved driving mechanism. Figs. 2 and 3 represent enlarged detail top views showing the angular arrangement of the intermediate gear. Fig. 4 represents a detail side view of the gears of the driving mechanism, the intermediate gear being arranged to revolve upon a stud instead of upon antifriction-rollers.

In the drawings Figs. 1 and 2, A represents the crank-shaft bracket; B, the crank-shaft; C, the driving-wheel bracket; D, the driving-wheel, and E the gear-casing.

The crank-shaft gear H engages with the teeth of the intermediate annular gear G, supported upon the antifriction-roller bearings $fff$ and engaging with the teeth of the pinion F, secured to the hub $b$ of the driving-wheel, the gear H and the pinion F being located in parallel planes, with the intermediate annular gear G arranged angularly to said planes and connecting the said gears. The crank-shaft gear H and the pinion F are represented as bevel-gears having their sides of greatest diameter at opposite sides of the respective gears, as shown in the drawings, and by this means the power may be economically transmitted from the crank-shaft B to the driving-wheel.

Instead of employing an annular intermediate gear G, as shown in Fig. 1, an intermediate gear G', arranged to rotate upon a stud $g$, may be employed, as shown in Fig. 4, the said stud being attached in any convenient manner to the frame I of the bicycle.

I claim as my invention—

The combination of a bicycle-frame, the driving-wheel, the crank-shaft, the bevel-gear pinion, and the bevel crank-shaft gear, having their greatest diameters at opposite sides of the intermediate gear, and the intermediate gear set at an angle with the planes of the crank-shaft gear and the pinion substantially as described.

WALTER E. TAFT.

Witnesses:
SOCRATES SCHOLFIELD,
HENRY E. HUGHES.